United States Patent
Wang

(10) Patent No.: US 6,520,043 B1
(45) Date of Patent: Feb. 18, 2003

(54) TRANSMISSION SHIFTER WITH INTEGRATED CABLE ADJUSTMENT MECHANISM

(75) Inventor: Yong-Qiang Wang, Rochester Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/608,769

(22) Filed: Jun. 30, 2000

(51) Int. Cl.$^7$ .............................. F16H 59/10; F16C 1/12
(52) U.S. Cl. .................. 74/473.15; 74/473.3; 74/502.2; 74/502.6
(58) Field of Search ........................ 74/501.5 R, 502.4, 74/473.15, 473.3, 473.36, 500.5, 501.6, 502, 502.2, 502.6

(56) References Cited

U.S. PATENT DOCUMENTS

| | | | | |
|---|---|---|---|---|
| 2,128,986 A | * | 9/1938 | Chilton | ..................... 74/502.6 |
| 3,470,771 A | * | 10/1969 | Houk | ..................... 74/473.24 |
| 5,025,901 A | | 6/1991 | Kito et al. | |
| 5,027,673 A | * | 7/1991 | Behrens et al. | ............ 74/501.6 |
| 5,207,124 A | * | 5/1993 | Anderson et al. | ............. 74/538 |
| 5,222,413 A | * | 6/1993 | Gallas et al. | ............. 74/502.4 |
| 5,251,723 A | | 10/1993 | Rolinski et al. | |
| 5,309,783 A | | 5/1994 | Doolittle et al. | |
| 5,438,890 A | * | 8/1995 | Kato | ..................... 74/501.5 R |
| 5,462,146 A | | 10/1995 | Doolittle et al. | |
| 5,662,001 A | | 9/1997 | Smale | |
| 5,673,596 A | * | 10/1997 | Lu | ............................. 74/502.6 |
| 5,701,838 A | | 12/1997 | Ito et al. | |
| 5,842,379 A | | 12/1998 | Kanamori | |
| 5,862,708 A | | 1/1999 | Shamoto | |
| 5,992,261 A | | 11/1999 | Iwata et al. | |

FOREIGN PATENT DOCUMENTS

EP          1 081 397       *  3/2001

* cited by examiner

Primary Examiner—William C Joyce
(74) Attorney, Agent, or Firm—Casimir R. Kiczek

(57) ABSTRACT

A transmission shifter for controlling a transmission of a motor vehicle by a cable has a base, a shift lever mounted on the base and pivotable along a shift path, the shift lever having a guidance opening, and a cable attachment bracket having a tail and adapted to receive a transmission cable. The cable attachment bracket is adjustably attached to the shift lever so that the cable attachment bracket may be adjusted with respect to the shift lever over an adjustment distance. To reduce vibrational noise, the tail is laterally captivated within the guidance opening. For ease of assembly, preferably the cable attachment bracket is attached to the shift lever free of the pivot pin.

19 Claims, 2 Drawing Sheets

ND OF THE INVENTION

TRANSMISSION SHIFTER WITH INTEGRATED CABLE ADJUSTMENT MECHANISM

FIELD OF THE INVENTION

The present invention is directed to transmission shifters for motor vehicles, and more particularly to improvements in transmission shifters which control the gear transmission of a motor vehicle via a push-pull cable.

BACKGROUND OF THE INVENTION

Transmission shifters, whether column mounted or floor mounted are used for operator control of the gear transmission in a motor vehicle. Floor mounted transmission shifters typically the transmission shifter has a shift lever which is mounted on a pivot pin and pivotable over a series of positions: park, reverse, neutral, drive and one or more lower gears, for example. Such transmission shifters can be connected to the gear transmission by, for example, a push-pull cable or electronically. For cable-actuated shifters, tangential motion of the shift lever pulls or pushes on the cable, transmitting load to the gear transmission of the motor vehicle. For proper installation of the shifter and cable there must be a length adjustment mechanism to compensate for variations in distances between cable mounting points. Also, the gear transmission may have some lash, and it is desirable to minimize the lash, preferably by some having some loading placed on the gear transmission from the cable.

In the past length adjustment mechanisms have typically been integrated into the cable assemblies to adjust the length of either the core or the conduit of the cable. However, cable manufacturing is a highly precise process. The more functions a cable needs to perform, the higher the costs associated with its manufacture. Therefore, recently the cable adjustment device has been incorporated into the transmission shifter. In one such known design where the cable adjustment device is incorporated into the transmission shifter, a bracket is mounted around the pivot pin with the shift lever and is provided with a pair of tabs. One tab extends upward and has a cable attachment pin, the other tab is bent over and has a slot. The slot is positioned over a metal yoke extending from the shift lever, and receives a fastening device which can be connected to the bracket at any length along the slot. A spring biases the bracket toward the gear transmission, and the slot accounts for any required length adjustment.

However, this design has several problems. The fastening device must be curved to align with the curved surface of the metal yoke, requiring a specially manufactured part. In addition, both the bracket and the yoke must be lined up with a hole in the base before insertion of the pivot pin, increasing manufacturing complexity. Moreover, vibrational loading can result in aesthetically unacceptable noise and rattle. Accordingly, there is a need for a transmission shifter with a low cost, easy to assembly cable adjustment mechanism that is relatively insensitive to vibrational loading.

In view of the foregoing, it is an object of the present invention to provide a transmission shifter which is of simple construction and low cost, that is highly reliable in operation, and that can be manufactured efficiently while maintaining high quality and reliability in shifting. It is an additional object of the present invention to provide a transmission shifter of quiet operation. Additional objects and optional features of the invention will be apparent form the following disclosure and detailed discussion of preferred embodiments.

SUMMARY OF THE INVENTION

In accordance with a first aspect, a transmission shifter comprises a base, a shift lever, mounted on the base and pivotable along a shift path, where the shift lever has a guidance opening. A cable attachment bracket having a tail is adapted to receive a transmission cable. A pin and slot arrangement or other suitable means for adjusting the cable attachment bracket over an adjustment distance is provided, so that the bracket may be adjusted with respect to the shift lever to account for travel lash along the transmission cable. The tail extends into the guidance opening such that the tail is laterally captivated, and the tail cooperates with the pin and slot arrangement to reduce free play between the cable attachment bracket and the shift lever.

In accordance with another aspect a transmission shifter comprises a base, a shift lever, a pivot pin extending through both the shift lever and the base, wherein the shift lever pivots with respect to the base about the pivot pin. A cable attachment bracket is adapted to receive a transmission cable. The cable attachment bracket maybe adjusted over an adjustment distance with respect to the shift lever to account for travel lash and dimensional variance along the length of the transmission cable, and the cable attachment bracket is attached to the shift lever free of the pivot pin.

From the foregoing disclosure and the following more detailed description of various preferred embodiments, it will be apparent to those skilled in the art that the present invention provides a significant advance in the technology and art of shift assemblies. Particularly significant in this regard is the potential the invention affords for reducing overall manufacturing costs of the transmission shifter control of a vehicle. Additional features and advantages of various preferred embodiments will be better understood in view of the detailed description provided below.

Figure 1:
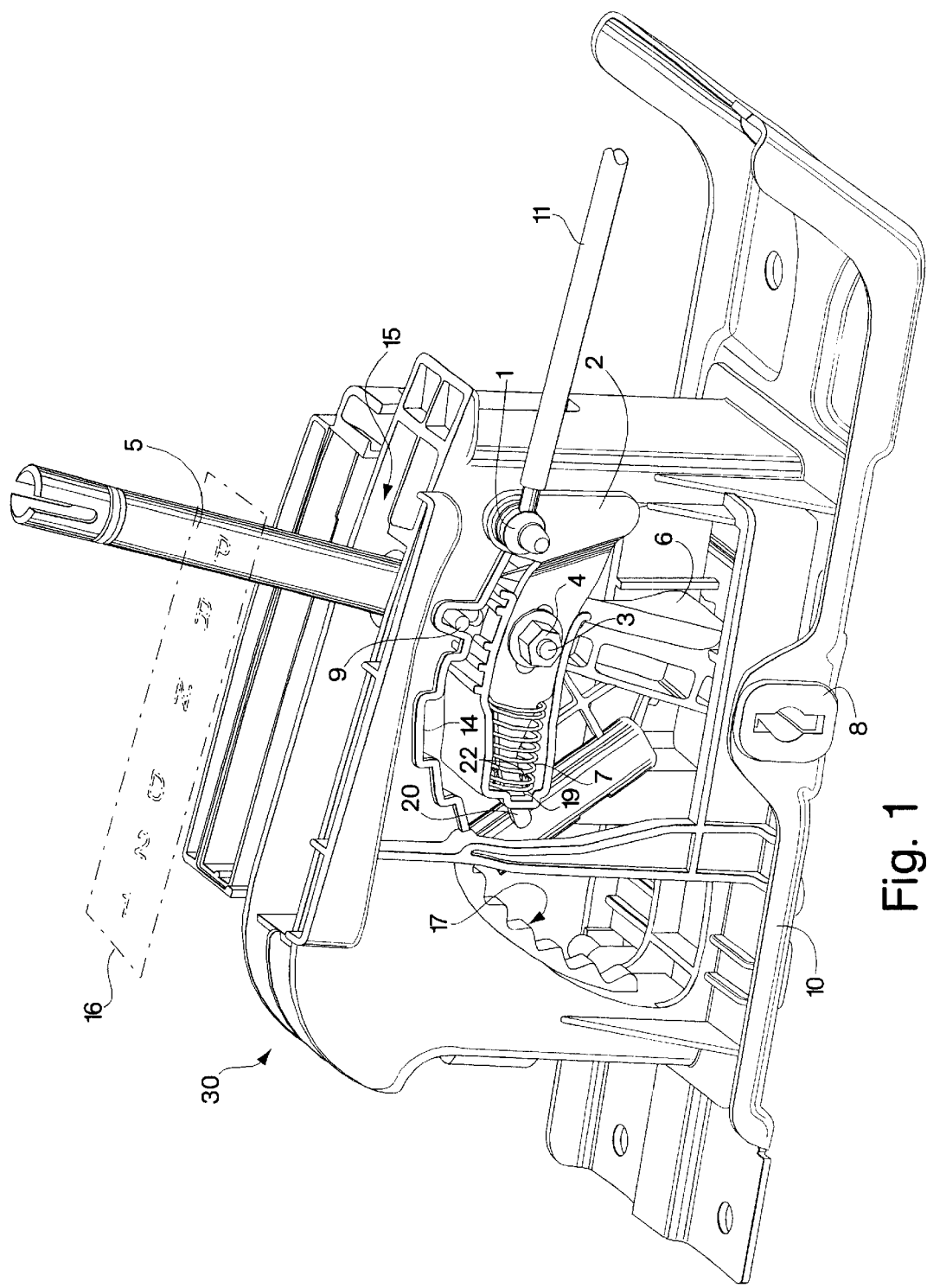
FIG. 1 is a perspective view of a preferred embodiment of a transmission shifter with the bezel removed and the side exposed, illustrating the transmission shifter in a park position.

It should be understood that the appended drawings are not necessarily to scale, presenting a somewhat simplified representation of various preferred features illustrative of the basic principles of the invention. The specific design features of the transmission shifter as disclosed here, including, for example, specific dimensions of the cable attachment bracket will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the transmission shifter illustrated in the drawings. In general, up or upward refers to the top of the paper in FIG. 1 and down or downward refers to a direction towards the bottom of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the transmission shifters disclosed here. The following detailed discussion of various alternative and preferred features and embodiments will illustrate the general principles of the invention with reference to an automatic transmission floor mounted shifter for use in controlling the gear transmission of a motor vehicle. Other embodiments suitable for other applications will be apparent to those skilled in the art given the benefit of this disclosure.

Figure 2:
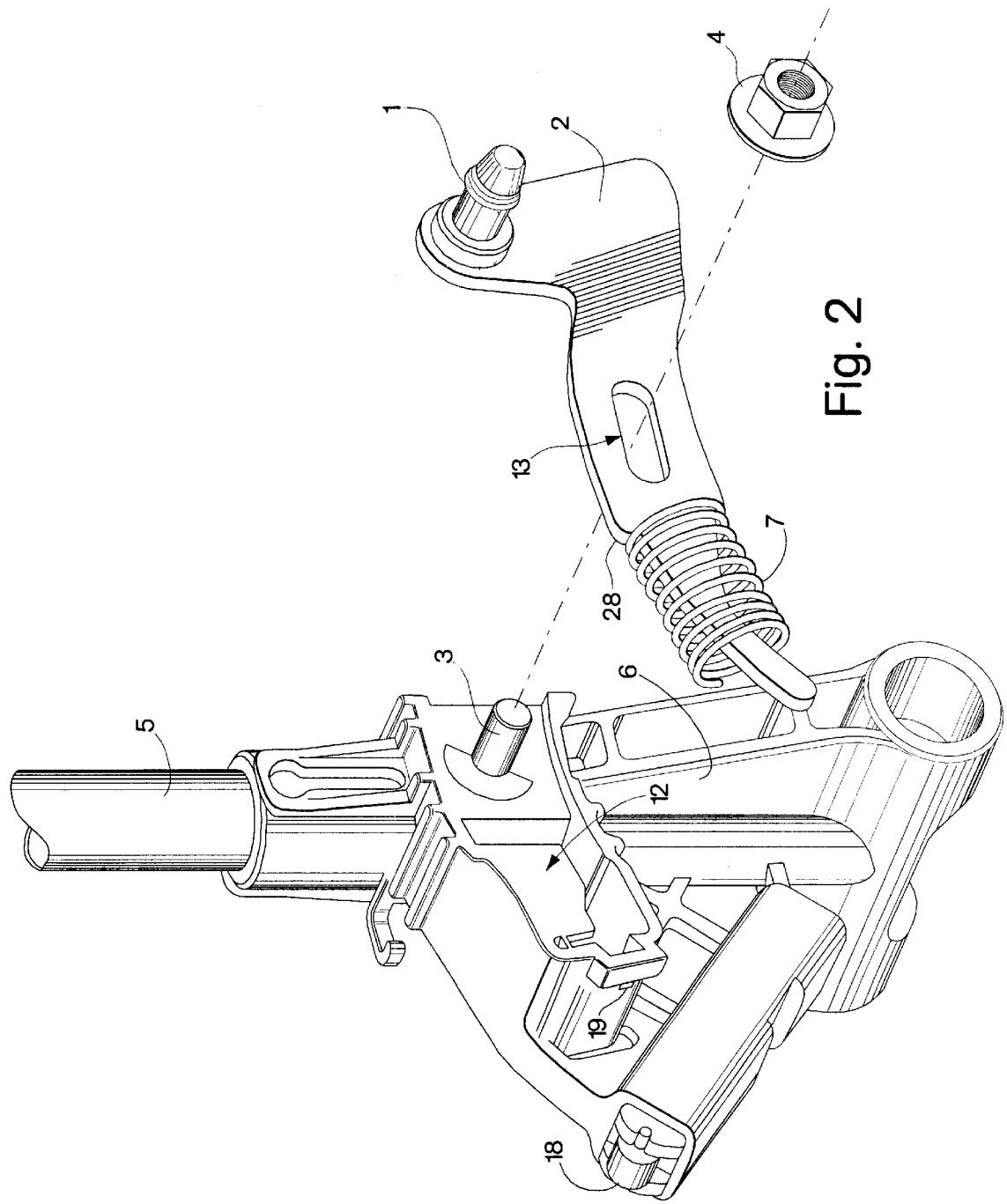
FIG. 2 is an exploded perspective view of the shift lever and the cable attachment bracket.

Turning now to the drawings, FIG. 1 shows a transmission shifter 30 in accordance with a preferred embodiment. For clarity of illustration, an operator handle for a shift lever 5 is not shown, and a bezel assembly 16 is only shown in phantom, with the well known PRND21 gear configuration. Of course, the transmissions shifter of the present invention can be used with other bezel assemblies and other gear configurations, and many different shaped handles may be used. Transmission shifter 30 has a base 10 having a central opening which receives the shift lever 5. Shift lever 5 is pivotable over a travel distance defined by top slot 15 in the base. The shift lever 5 has a yoke 6, preferably made of an engineering plastic that is overmolded onto the shift lever. The shift lever is pivotably mounted on a pivot pin 8 which extends through both an opening in the yoke and an opening in the base 10. The top of the shift lever extends through top slot 15 in the base to where it can be reached by an operator. The base 10 is provided with a series of position detents 14, each one corresponding to a gear transmission position (Park, Reverse, etc.) when the shift lever 5 is pivoted so that detent pin 9 is in that particular position detent. The base is also provided with a series of tactile sensation detents 17 which engage a spring biased roller 18 (best seen in FIG. 2) as the shift lever pivots over its travel distance. The tactile sensation detents provide a positive feel to an operator of the shift lever to indicate that the shift lever has moved to a position corresponding to a particular gear transmission position.

Attached to the shift lever at a recessed slot or track 12 in the yoke 6 is a cable attachment bracket 2. The cable attachment bracket preferably comprises a simple metal stamping. A typical cable used in this application is a push-pull cable having a conduit and a core and capable of transmitting load in both tension and compression. The cable 11 would normally be attached at one end to a cable attachment pin 1 mounted on the cable attachment bracket 2, and at a second end (not shown) to a gear transmission of a motor vehicle. The cable attachment pin 1 is shown in the drawings as preferably having a simple cylindrical shape. As seen in FIG. 1, the cable attachment pin may optionally be positioned on a flange of the cable attachment bracket 2 positioned outside of the base for proper alignment of the pin 1 with the cable 11. Advantageously, the cable attachment bracket 2 is connected to the yoke 6 above and out of contact with the pivot pin 8. Therefore the shift lever 5 can be attached to the base 10 independent of assembly of the cable attachment bracket 2 to the shift lever 5.

As seen in the FIGS., the cable attachment bracket 2 is provided with a slot 13, and a fastener 3 such as a threaded bolt extends from the yoke 6 through the slot. During initial installation, the cable attachment bracket 2 may be adjusted the length of the slot to account for varying lengths between the shifter 30 and the gear transmission. The slot 13 determines the adjustment length of the bracket 2 with respect to the yoke 6. This adjustment length can be, for example, about 16 mm. If the alignment and dimensions are perfect, the fastener 3 should preferably extend through the center of the slot 13, equidistant from either end of the slot. Other suitable devices for adjustably attaching the cable attachment bracket 2 to the yoke 6, including, for example, providing a slot in the yoke and a pin extending from the cable attachment bracket, will be readily apparent to those skilled in the art given the benefit of this disclosure.

In accordance with a highly advantageous feature, the cable attachment bracket is provided with a tail 20 which extends through an opening 19 in the yoke, laterally captivating the tail. That is, the tail 20 is free to slide through the opening 19 over the adjustment length of the cable attachment bracket 2 during initial adjustment and alignment, but other movement of the bracket 2 with respect to the yoke 6 is restricted. Free play of the bracket 2 is controlled by the tail 20, guidance opening 19, fastener 3 and nut 4, and the track 12, advantageously reducing noise and rattle during operation. More specifically, the guidance opening 19 cooperates with the fastener 3 and nut 4 to reduce side-to-side movement of the bracket 2, and the bracket is restricted by the walls of the track 12 from up-and-down movement with respect to the yoke. Unitary fingers 22 extending from the yoke 6 may be provided to route the spring 7 away from the opening 19.

It is preferable to have the cable 11 loaded in compression at initial assembly so that the shifter is biased towards the Park position. Therefore, a spring such as compression spring 7 is positioned within the track between the yoke 6 and a ledge 28 of the cable attachment bracket 2, biasing the cable attachment bracket away from the yoke and toward the gear transmission. Once the cable attachment bracket 2 is positioned properly, a nut 4 attached to the threaded fastener is tightened to fix the position of the cable attachment bracket with respect to the yoke 6 and the shift lever 5.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A transmission shifter comprising, in combination:

a base;

a shift lever, mounted on the base and pivotable along a shift path, the shift lever having a guidance opening;

a cable attachment bracket having a tail and adapted to receive a transmission cable; and means for adjustably attaching the cable to the shift lever, so that the cable attachment bracket may be adjusted with respect to the shift lever over an adjustment distance;

wherein the means for adjustably attaching the cable attachment bracket comprises a projection extending from the shift lever into a slot in the cable attachment bracket, wherein the slot limits the adjustment distance of the cable attachment bracket;

wherein the guidance opening is oriented generally perpendicular to the slot so that the tail slides through the guidance opening over the adjustment distance as the projection is moved along the slot;

wherein the tail is laterally captivated within the guidance opening and cooperates with the means for adjustably attaching the cable attachment bracket to the shift lever to restrict free play of the cable attachment bracket with respect to the shift lever.

2. The transmission shifter of claim 1 wherein the projection is a threaded bolt and a nut secures the cable attachment bracket to the shift lever.

3. The transmission shifter of claim 1 wherein the adjustment distance of the cable attachment bracket is about 16 millimeters.

4. The transmission shifter of claim 1 wherein the cable attachment bracket has a flange that extends outside of the base and a cable attachment pin is attached to the flange.

5. The transmission shifter of claim 1 wherein the projection extends parallel to a pivot axis of the shift lever.

6. A transmission shifter comprising, in combination:
   a base;
   a shift lever, mounted on the base and pivotable along a shift path, the shift lever having a guidance opening;
   a cable attachment bracket having a tail and adapted to receive a transmission cable; and
   means for adjustably attaching the cable to the shift lever, so that the cable attachment bracket may be adjusted with respect to the shift lever over an adjustment distance;
   wherein the tail is laterally captivated within the guidance opening and cooperates with the means for adjustably attaching the cable attachment bracket to the shift lever to restrict free play of the cable attachment bracket with respect to the shift lever;
   wherein the shift lever further comprises a yoke and a track is formed in the yoke, and the cable attachment bracket is positioned in the track.

7. The transmission shifter of claim 6 wherein the yoke is formed of an injection molded plastic.

8. The transmission shifter of claim 6 further comprising a pivot pin extending through an opening in the base and an opening in the yoke, pivotably securing the shift lever to the base.

9. The transmission shifter of claim 6 wherein the guidance opening is formed in the yoke at an end of the track.

10. The transmission shifter of claim 6 further comprising a spring positioned in the track between the shift lever and the cable attachment bracket, biasing the cable attachment bracket away from the guidance opening.

11. The transmission shifter of claim 10 wherein the spring is positioned between a ledge on the cable attachment bracket and an end of the track adjacent the guidance opening.

12. The transmission shifter of claim 10 further comprising at least one finger extending into the track, guiding the spring away from the guidance opening.

13. A transmission shifter comprising, in combination;
   a base,
   a shift lever having a guidance opening:
   a pivot pin extending through both the shift lever and the base, wherein the shift lever pivots with respect to the base about the pivot pin;
   a cable attachment bracket having one end including a tail and a portion spaced apart from the tail and being adapted to receive a transmission cable, the tail being slidable through the guidance opening and laterally captivated within the guidance opening:
   and
   means for adjustably attaching the cable attachment bracket to the shift lever;
   wherein the cable attachment bracket is attached to the shift lever free of the pivot pin; and
   wherein the means for adjustably attaching the cable attachment bracket comprises a projection extending from the shift lever into a slot in the cable attachment bracket.

14. The transmission shifter of claim 13 wherein the projection extends parallel to a pivot axis of the shift lever.

15. The transmission shifter of claim wherein the guidance opening is oriented generally perpendicular to the slot so that the tail slides through the guidance opening over the adjustment distance as the projection is moved along the slot.

16. A transmission shifter comprising, in combination:
   a base
   a shift lever;
   a pivot pin extending through both the shift lever and the base, wherein the shift lever pivots with respect to the base about the pivot pin;
   a cable attachment bracket having one end including a tail and a portion spaced apart from the tail and being adapted to receive a transmission cable;
   means for laterally guiding the tail;
   means for adjustably attaching the cable attachment bracket to the shift lever;
   wherein the cable attachment bracket is attached to the shift lever free of the pivot pin; and
   a yoke, wherein a track is formed in the yoke and the cable attachment bracket is received in the track.

17. A transmission shifter adjustment apparatus adapted for use with a transmission cable, the shifter having a base, a shift lever, and a pivot pin extending through the shift lever and the base to permit the shift lever to pivot about the pivot pin relative to the base, the apparatus comprising, in combination:
   a bracket adjustably attached to the shift lever free of the pivot pin, the bracket having a tail, a pin in spaced relation apart from the tail to receive the transmission cable, and a portion forming a slot;
   the shift lever having a guidance opening, the tail being disposed and laterally constrained by the guidance opening;
   a projection extending from the shift lever and disposed in the slot; and
   a biasing member interposed the shift lever and the bracket to bias the bracket away from the shift lever.

18. The transmission shifter apparatus of claim 17 wherein the biasing member is a compression spring.

19. The transmission shifter apparatus of claim 17 wherein the slot is between the tail and the pin.

* * * * *